(12) United States Patent
Nessler et al.

(10) Patent No.: US 12,030,515 B2
(45) Date of Patent: Jul. 9, 2024

(54) VEHICLE CONTROL APPARATUS

(71) Applicant: Honda Motor Co., Ltd., Tokyo (JP)

(72) Inventors: Jens Nessler, Offenbach/Am Main (DE); Marcus Kleinehagenbrock, Offenbach/Am Main (DE)

(73) Assignee: Honda Motor Co., Ltd., Tokyo (JP)

( * ) Notice: Subject to any disclaimer, the term of this patent is extended or adjusted under 35 U.S.C. 154(b) by 40 days.

(21) Appl. No.: 17/982,495

(22) Filed: Nov. 7, 2022

(65) Prior Publication Data
US 2023/0150526 A1 May 18, 2023

(51) Int. Cl.
*B60W 50/14* (2020.01)
*B60W 30/09* (2012.01)
*B60W 30/14* (2006.01)
*B60W 40/04* (2006.01)
*B60W 40/105* (2012.01)
*G06V 20/58* (2022.01)

(52) U.S. Cl.
CPC ............ *B60W 50/14* (2013.01); *B60W 30/09* (2013.01); *B60W 30/146* (2013.01); *B60W 40/04* (2013.01); *B60W 40/105* (2013.01); *G06V 20/582* (2022.01); *B60W 2050/143* (2013.01); *B60W 2050/146* (2013.01); *B60W 2420/403* (2013.01); *B60W 2555/60* (2020.02); *B60W 2556/40* (2020.02)

(58) Field of Classification Search
CPC .... B60W 50/14; B60W 30/09; B60W 30/146; B60W 40/04; B60W 40/105; B60W 2050/143; B60W 2050/146; B60W 2420/403; B60W 2555/60; B60W 2556/40; B60W 2552/00; B60W 2552/50; B60W 2552/53; B60W 30/18159; B60W 40/02; G06V 20/582
See application file for complete search history.

(56) References Cited

U.S. PATENT DOCUMENTS 11,433,925 B2 * 9/2022 Etcheverry .......... G06V 20/588
2014/0067187 A1 * 3/2014 Ferguson .......... B60W 60/0011
701/28

(Continued)

FOREIGN PATENT DOCUMENTS

JP 2021507406 A 2/2021

*Primary Examiner* — An T Nguyen
(74) *Attorney, Agent, or Firm* — Duft & Bornsen, PC (57) ABSTRACT

A vehicle control apparatus includes an actuator used for traveling, an output device outputting information, and a microprocessor and a memory coupled to the microprocessor. The microprocessor performs capturing an image ahead of the vehicle, recognizing a traffic sign included in an imaging range of the captured image, controlling at least one of the output device and the actuator based on information of the recognized traffic sign, and determining whether the vehicle is traveling in a restricted section in which a predetermined travel restriction including at least one of a vehicle speed limit and overtaking limit is imposed temporarily. The microprocessor performs the controlling including controlling, when it is determined that the vehicle is traveling in the restricted section, at least one of the output device and the actuator without using the information of the traffic sign even if the traffic sign is recognized.

16 Claims, 8 Drawing Sheets

(56) References Cited

U.S. PATENT DOCUMENTS

| | | | |
|---|---|---|---|
| 2015/0241878 A1* | 8/2015 | Crombez | B60W 60/00184 |
| | | | 701/23 |
| 2015/0302747 A1* | 10/2015 | Ro | G08G 1/096783 |
| | | | 340/905 |
| 2019/0205674 A1* | 7/2019 | Silver | B60W 40/105 |
| 2019/0283749 A1* | 9/2019 | Girond | G08G 1/096725 |
| 2019/0311207 A1* | 10/2019 | Oniwa | B60W 50/12 |
| 2020/0042807 A1* | 2/2020 | Schutzmeier | G06V 20/582 |
| 2023/0150526 A1* | 5/2023 | Nessler | B60W 40/105 |
| | | | 340/435 |

* cited by examiner

VEHICLE CONTROL APPARATUS

CROSS-REFERENCE TO RELATED APPLICATION

This application is based upon and claims the benefit of priority from Japanese Patent Application No. 2021-184467 filed on Nov. 12, 2021, the content of which is incorporated herein by reference.

BACKGROUND OF THE INVENTION

Field of the Invention

This invention relates to a vehicle control apparatus configured to control a vehicle.

Description of the Related Art

Conventionally, there is a known apparatus configured to, when a temporarily installed speed limit sign is recognized, control a vehicle according to the speed limit sign in a particular section such as a road construction section associated with the speed limit sign, for example, in Japanese Unexamined Patent Publication No. 2021-507406 (JP2021-507406A).

However, when controlling traveling according to a temporarily installed speed limit sign, as in the apparatus described in JP2021-507406A, if a traffic sign permanently installed in the same section as the section associated with the temporarily installed speed limit sign is recognized, satisfactory traveling control may not be possible.

SUMMARY OF THE INVENTION

An aspect of the present invention is a vehicle control apparatus comprising an actuator used for traveling, an output device outputting information, and a microprocessor and a memory coupled to the microprocessor. The microprocessor is configured to perform capturing an image ahead of the vehicle, recognizing a traffic sign included in an imaging range of the image captured in the capturing, controlling at least one of the output device and the actuator based on information of the traffic sign recognized in the recognizing, and determining whether the vehicle is traveling in a restricted section in which a predetermined travel restriction including at least one of a vehicle speed limit and overtaking limit is imposed temporarily. The microprocessor is configured to perform the controlling including controlling, when it is determined that the vehicle is traveling in the restricted section in the determining, at least one of the output device and the actuator without using the information of the traffic sign even if the traffic sign is recognized in the recognizing.

Another aspect of the present invention is a vehicle control apparatus comprising an actuator used for traveling, an output device outputting information, and a microprocessor and a memory coupled to the microprocessor. The microprocessor is configured to perform capturing an image ahead of the vehicle, recognizing a traffic sign included in an imaging range of the image captured in the capturing, controlling at least one of the output device and the actuator based on information of the traffic sign recognized in the recognizing, and determining whether the vehicle is traveling in a restricted section in which a predetermined travel restriction including at least one of a vehicle speed limit and overtaking limit is imposed temporarily. The recognizing includes recognizing a plurality of speed limit signs before the vehicle reaches the restricted section. The microprocessor is configured to perform the controlling including controlling, when it is determined in the determining that the vehicle is traveling in the restricted section, at least one of the output device and the actuator based on a first traffic sign, the first traffic sign being a latest speed limit sign among the plurality of speed limit signs recognized in the recognizing, and then, controlling, when a second traffic sign indicating a lower speed limit than the first traffic sign is recognized in the recognizing while the vehicle is traveling in the restricted section, at least one of the output device and the actuator based on the second traffic sign.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

A description will be given below of an embodiment of the present invention with reference to FIGS. 1 to 8. A vehicle control apparatus according to the embodiment of the present invention can be applied to a vehicle having a self-driving capability, that is, an automated vehicle. A vehicle to which the vehicle control apparatus according to the present embodiment is applied may be sometimes called a subject vehicle by distinguishing it from other vehicles. The subject vehicle may be any of an engine vehicle having an internal combustion engine as a travel drive source, an electric vehicle having an electric motor as a travel drive source, and a hybrid vehicle having a combustion engine and an electric motor as a travel drive source. The subject vehicle can not only travel in the automated driving mode where driving operation by the driver is unnecessary, but also travel in the manual driving mode by driving operation of the driver.

Figure 1:
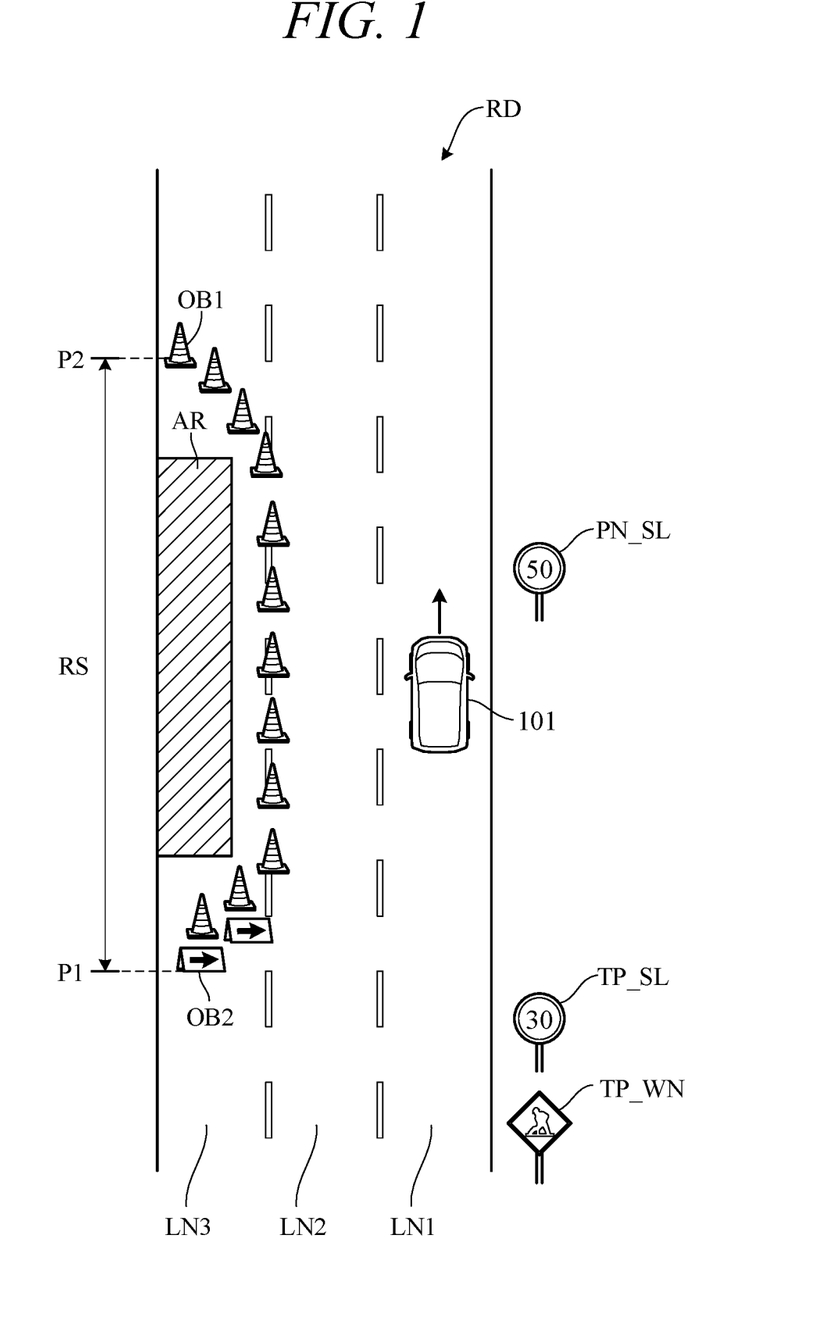
FIG. 1 is a diagram showing an example of a traveling scene of a vehicle having a vehicle control apparatus according to an embodiment of the present invention.

FIG. 1 is a diagram showing an example of a traveling scene of the subject vehicle having the vehicle control apparatus according to the embodiment of the present invention. FIG. 1 shows an example in which the subject vehicle 101 travels on a road RD with three lanes (lanes LN1, LN2 and LN3) on one side. A construction section RS is installed in a left end lane LN3 of the road RD. In the construction section RS, road cones OB1 are installed around an area AR where is the construction site, and signboards OB2 prompting lane change from lane LN3 to other lanes are installed before the area AR. Before the construction section RS, a traffic sign TP_WN indicating that road construction is in progress ahead and a traffic sign TP_SL indicating that the maximum vehicle speed is limited to 30 km/h are installed on the right side of the road RD. A traffic sign PN_SL indicating that the maximum vehicle speed is limited to 50 km/h is installed in the construction section RS. The traffic sign PN_SL is a traffic sign permanently installed before the construction section RS has been installed on the road RD. On the other hand, the traffic signs TP_SL, TP_WN, the signboards OB2, and the road cones OB1 are temporarily installed during the construction and are removed after the completion of the construction.

When the subject vehicle 101 detects the traffic sign TP_WN ahead of the subject vehicle 101 while traveling on the road RD, the subject vehicle 101 recognizes that there is the construction section RS ahead of the subject vehicle 101. When the subject vehicle 101 detects the traffic sign TP_SL together with the traffic sign TP_WN, the subject vehicle 101 recognizes that the maximum vehicle speed is limited to 30 km/h in the construction section RS. The subject vehicle 101 travels so that the vehicle speed does not exceed the speed limit 30 km/h after entering the construction section until leaving the construction section RS.

However, as shown in FIG. 1, when, in the construction section RS, there is the traffic sign PN_SL permanently installed prior to the start of the construction, the subject vehicle 101 detects the traffic sign PN_SL while traveling in the construction section RS. At this time, the subject vehicle 101 recognizes that the speed limit has changed from 30 km/h to 50 km/h, and may travel the construction section RS at a vehicle speed higher than the speed limit 30 km/h set for the construction section RS. In this manner, when the speed limit of the permanently installed traffic sign PN_SL is higher than that of the temporarily installed traffic sign TP_SL, there is a possibility that good driving control will not be performed in the construction section RS. Therefore, in the present embodiment, the vehicle control apparatus is configured as follows.

Figure 2:
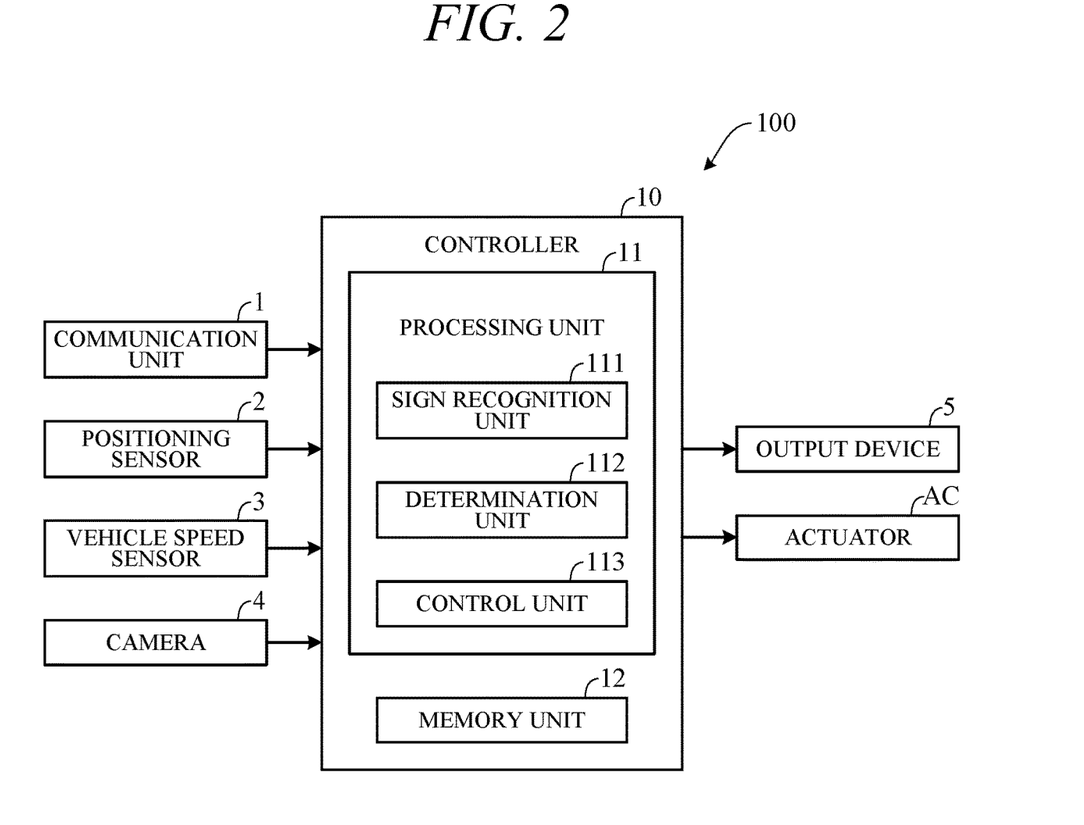
FIG. 2 is a block diagram schematically showing a configuration of main components of the vehicle control apparatus according to the embodiment of the present invention.

FIG. 2 is a block diagram schematically showing a configuration of main components of the vehicle control apparatus 100 according to the embodiment of the present invention. As shown in FIG. 2, the vehicle control apparatus 100 includes a controller 10, a communication unit 1, a positioning sensor 2, a vehicle speed sensor 3, a camera 4, an output device 5, and an actuator AC. The positioning sensor 2, the vehicle speed sensor 3, the camera 4, the output device 5, and the actuator AC are communicatively connected to the controller 10, respectively.

The communication unit 1 communicates with various servers (not shown) through a network including a wireless communication network such as an Internet network or a cellular telephone network, and acquires map information, traffic information, and the like from a server periodically or at an arbitrary timing. The network includes not only a public wireless network, but also a closed communications network established for a predetermined administrative area, such as a wireless LAN, Wi-Fi (registered trademark), or Bluetooth (registered trademark). The acquired map information is output to the memory unit 12 (to be described later) and updated as needed.

The positioning sensor 2 receives a signal for positioning transmitted from the positioning satellite. The positioning satellite is an artificial satellite such as a GPS satellite or a quasi-zenith satellite. Using the position information received by the positioning sensor 2, the current position of the subject vehicle 101 (latitude, longitude, altitude) is determined. The positioning sensor 2 is used to determine the position of the subject vehicle 101. It is also possible to use a distance sensor (radar, lidar, etc.) for determining the distance from the subject vehicle 101 to an object (object installed on the road) instead of the positioning sensor 2. In this case, based on the position information of the object installed on the road obtained from the map information stored in the memory unit 12 (to be described later) and the distance information to the object obtained by the positioning sensor 2, the position of the subject vehicle 101 is determined. The positioning sensor 2 may be used together with the distance sensor. The vehicle speed sensor 3 determines the travel speed of the subject vehicle 101. The camera 4 has an image sensor such as a CCD or a CMOS. The camera 4 may be a monocular camera or a stereo camera. The camera 4 captures a periphery of the subject vehicle 101. The camera 4 is, for example, attached to a predetermined position of the front portion of the subject vehicle 101. The camera 4 continuously captures the space ahead of the subject vehicle 101 to acquire image data (hereinafter, referred to as "captured image data" or simply "captured image") of the object.

The output device 5 is a generic name of a device for outputting information to a driver. For example, the output device 5 includes a display for providing information to a driver via a display image, a speaker for providing information to the driver in sound, and the like.

The actuator AC is a traveling actuator for controlling the traveling of the subject vehicle 101. If the travel drive source is a combustion engine, the actuator AC includes a throttle actuator that adjusts the opening of the throttle valve of the engine. If the travel drive source is an electric motor, the electric motor is included in the actuator AC. The actuator AC also includes a brake actuator for actuating a braking device of the subject vehicle 101 and a steering actuator for driving a steering device of the subject vehicle 101.

The controller 10 comprises an electronic control unit (ECU). More specifically, the controller 10 includes a computer having a processing unit 11 such as a central processing unit (microprocessor), a memory unit 12 such as ROM and RAM, and other peripheral circuits (not shown) such as an I/O interface. Although a plurality of ECUs having different functions, such as a combustion engine control ECU, an electric motor control ECU, and an ECU for the braking device, can be provided separately, the controller 10 is shown in FIG. 2 as a set of these ECUs for convenience.

The memory unit 12 stores high-precision detailed map information, which is referred to as high-precision map information. The high-precision map information includes position information of roads, information on the shapes of roads (curvature, etc.), information on the slopes of roads, position information of intersections and branching points, information on the number of lanes, speed limits, and width of lanes, position information for each lane (information on the center position of lanes and the boundary line of lanes), position information of landmarks (traffic lights, buildings, etc.) on the map, information on traffic signs (position, type, regulatory information, etc.), information on road surface profiles such as unevenness of the road surface, etc. The memory unit 12 also stores various control programs, thresholds used in the programs, and other information.

The processing unit 11 includes, as functional configurations, a sign recognition unit 111, a determination unit 112, and a control unit 113. The sign recognition unit 111 detects traffic signs included in the imaging range based on the captured image obtained by the camera 4. The sign recognition unit 111 recognizes information on the detected traffic sign, for example, information on the type (warning sign and restriction sign), the content, the installation position, and the like based on the captured image to store the information in the memory unit 12. When the information of the traffic signs is stored in the memory unit 12 in a predetermined amount or more, the sign recognition unit 111 deletes the information of the traffic sign in order from the traffic sign with the oldest detection time.

The control unit 113 controls at least one of the output device 5 and the actuator AC based on the information of the traffic sign recognized by the sign recognition unit 111. In the following, the operation of the control unit 113 controls at least one of the output device 5 and the actuator AC, may be referred to as "vehicle control".

When a traffic sign is recognized by the sign recognition unit 111 while the subject vehicle 101 is traveling in the manual driving mode, the control unit 113 controls the output device 5 based on the information of the traffic sign. More specifically, the control unit 113 controls the output device 5 (display) so that the information of the traffic sign is informed to the user in an image. For example, when a traffic sign for limiting the maximum vehicle speed to 50 km/h is recognized by the sign recognition unit 111, the control unit 113 controls the output device 5 to display an image indicating that the speed limit is 50 km/h on the display to notify the user. The control unit 113 may control the output device 5 (speaker) so that the information of the traffic sign is informed to the user audibly.

On the other hand, when a traffic sign is recognized by the sign recognition unit 111 while the subject vehicle 101 is running in the automated driving mode, the control unit 113 controls the actuator AC based on the information of the traffic sign. For example, when a traffic sign for limiting the maximum vehicle speed to 50 km/h is recognized by the sign recognition unit 111, the control unit 113 controls the actuator AC so that the vehicle speed detected by the vehicle speed sensor 3 does not exceed the speed limit 50 km/h. At this time, the control unit 113 may also control the output device 5 so that the information of the traffic sign is informed to the user.

The determination unit 112 determines whether or not the subject vehicle 101 is traveling in a restricted section. The restricted section is a section in which a predetermined travel limit including at least one of a vehicle speed limit and an overtaking limit is temporarily imposed, and is, for example, the construction section RS in FIG. 1. Further, the restricted section is, for example, a section in which the speed limit different from the speed limit set for the road in advance is set.

First, the determination unit 112 determines whether or not there is a restricted section ahead of the subject vehicle 101 based on the captured image of the camera 4. For example, when a traffic sign indicating that road construction is being performed is included in the imaging range of the camera 4, the determination unit 112 determines that there is a restricted section ahead of the subject vehicle 101. Incidentally, the determination unit 112, when a predetermined number or more road cones (road cones OB1 of FIG. 1) are included in the imaging range of the camera 4, or when a temporary signboard prompting lane change (signboard OB2 of FIG. 1) is included in the imaging range of the camera 4, it may be determined that there is a restricted section ahead of the subject vehicle 101. Further, it may be determined that there is a restricted section ahead of the subject vehicle 101 when the temporary guard rail is included in the imaging range of the camera 4. Further, the determination unit 112 may detect a restricted section such as a construction section based on information obtained by V2X (Vehicle-to-Everything) communication via the communication unit 1. Further, a method of combining the above methods or other methods may be used, and a method of detecting a restricted section is not limited thereto.

The determination unit 112 detects a start position of the restricted section (position P1 in FIG. 1) based on the position where the road cone and the signboard are located, and then, the determination unit 112 determines whether or not the subject vehicle 101 has entered the restricted section based on the start position and the vehicle position (current position of the subject vehicle 101) detected by the positioning sensor 2. Specifically, when the vehicle position detected by the positioning sensor 2 exceeds the start position of the restricted section, it is determined that the subject vehicle 101 has entered the restricted section. Incidentally, the determination unit 112 may detect the start position of the restricted section based on information obtained by V2X communication via the communication unit 1.

The determination unit 112 detects an end position of the restricted section (position P2 in FIG. 1) based on the captured image of the camera 4. At that time, the determination unit 112 may detect the point where the number of road cones which are included in the imaging range of the camera 4 becomes less than a predetermined number as the end position of the restricted section, or may detect the end position of the restricted section based on the arrangement of the road cones which are included in the imaging range of the camera 4 (the arrangement of the road cones OB1 near the position P2 in FIG. 1, specially, the arrangement of the road cones OB1 such that the widthwise position of the road cones OB 1 on the far side of the traveling direction gradually approaches the edge of the road). When a traffic sign indicating the end of a restricted section is included in the captured image of the camera 4, the determination unit 112 may detect the position where this traffic sign is installed as the end position of the restricted section. Further, the determination unit 112 may detect the end position of the restricted section based on the map information stored in the memory unit 12 and the captured image of the camera 4. Specifically, the determination unit 112 may detect a point where the number of lanes (lanes not under construction) recognized based on the captured image matches the number of lanes indicated by the map information as the end position of the restricted section such as the construction section. Furthermore, the determination unit 112 may recognize the end position of the restricted section based on information obtained by V2X communication via the communication unit 1. For example, a point where information indicating that the vehicle position is included in the construction section cannot be no longer received from a RSU (road side unit) installed on a road may be recognized as an end position of the construction section.

The determination unit 112, when the vehicle position detected by the positioning sensor 2 exceeds the end position of the restricted section, determines that the subject vehicle 101 leaves the restricted section. Further, the determination unit 112 determines that the subject vehicle 101 is traveling in the restricted section during a period from when the subject vehicle 101 enters the restricted section to when the subject vehicle 101 leaves the restricted section. Incidentally, the determination unit 112, while the objects related to the restricted section are detected in the imaging range of the camera 4, the subject vehicle 101 may be determined to be traveling in the restricted section.

When it is determined by the determination unit 112 that the subject vehicle 101 is traveling in the restricted section, the control unit 113 performs the vehicle control based on the information of the traffic sign that is the latest traffic sign among a plurality of traffic signs recognized by the sign recognition unit 111 before the subject vehicle 101 reaches the restricted section. That is, while it is determined by the determination unit 112 that the subject vehicle 101 is traveling in the restricted section, the control unit 113, even if a traffic sign is recognized by the sign recognition unit 111, performs the vehicle control without using information of the recognized traffic sign.

Thereafter, when it is determined that the subject vehicle 101 leaves the restricted section by the determination unit 112, the control unit 113 performs the vehicle control based on information of a traffic sign which, while the determination unit 112 has determined that the subject vehicle 101 has travelled in the restricted section, has been stored in the memory unit 12 by the sign recognition unit 111.

Figure 3:
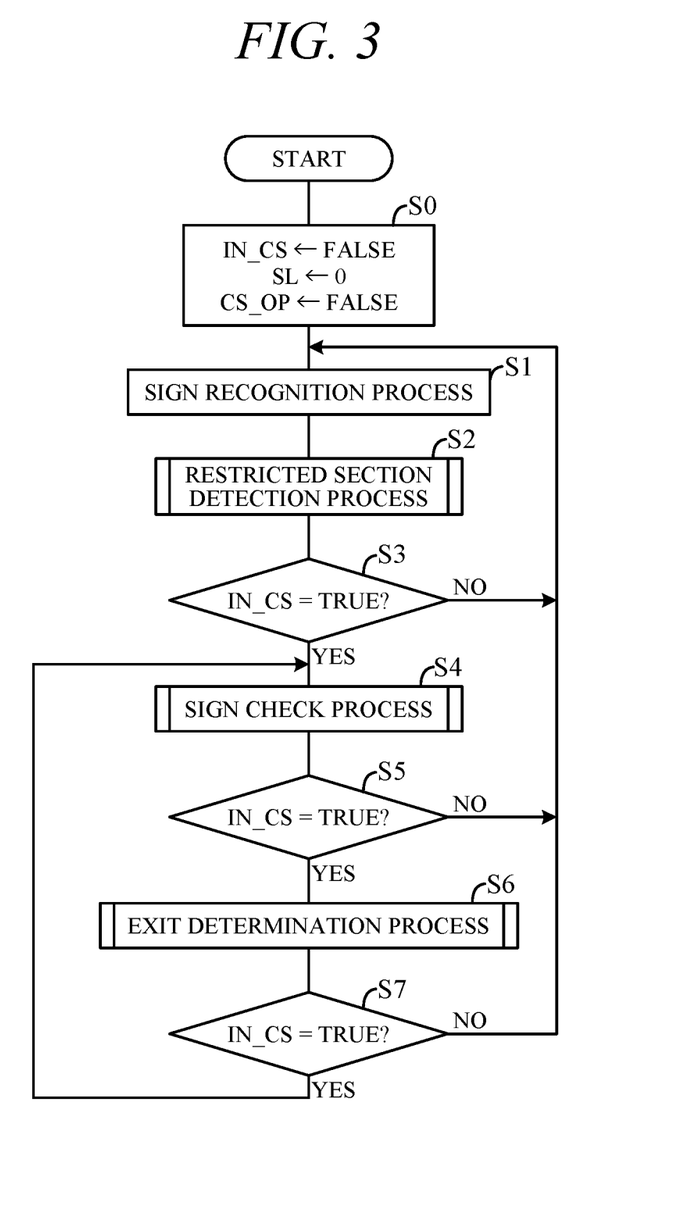
FIG. 3 is a flowchart showing an example of processing executed by the controller of FIG. 2.

FIG. 3 is a flowchart showing an example of processing executed by the controller 10 of FIG. 2. The processing shown in this flowchart is executed, for example, while the subject vehicle 101 is traveling in the automated driving mode or the manual driving mode.

As shown in FIG. 3, first, in S0 (S: process step), flags IN_CS, CS_OP and speed limit information SL are initialized. The flag IN_CS indicates by 1 (TRUE) and 0 (FALSE) whether or not the subject vehicle 101 is traveling in the restricted section. The flag IN_CS is initialized to 0. The speed limit information SL is information indicating a speed limit. The speed limit information SL is initialized to 0 km/h. The speed limit information SL set to 0 km/h indicates that the speed limit is not imposed. The flag CS_OP indicates by 1 (TRUE) and 0 (FALSE) whether or not overtaking prohibition is imposed. The flag CS_OP is initialized to 0. The flags IN_CS, CS_OP and the speed limit information SL are stored in the memory unit 12.

In S1, a sign recognition process is performed. The sign recognition process is performed while the subject vehicle 101 is traveling on a road that is not a restricted section. More specifically, when a traffic sign is detected based on the captured image of the camera 4 and information of the detected traffic sign is recognized, the speed limit information SL and the flag CS_OP are set based on the recognized information of the traffic sign. In S1, when the information indicated by the speed limit sign recognized while the subject vehicle 101 is traveling in the restricted section is stored in the memory unit 12, the information is set as the speed limit information SL.

In S2, a restricted section detection process is performed. The restricted section detection process is a process of detecting the restricted section ahead of the subject vehicle 101 based on the captured image of the camera 4. The restricted section detection process will be described later with reference to FIG. 4. In S3, it is determined whether or not the flag IN_CS is set to 1, that is, whether or not the subject vehicle 101 is traveling in the restricted section. If the result in S3 is NO, the process returns to S1.

If the result in S3 is YES, a sign check process is performed in S4. The sign check process is a process of checking a traffic sign ahead of the subject vehicle 101 based on the captured image of the camera 4. The sign check process will be described later with reference to FIG. 5. In S5, it is determined whether or not the flag IN_CS is 1. If the result of S5 is NO, the process returns to S1. If the result in S5 is YES, an exit determination process is performed in S6. The exit determination process is a process of determining whether or not the subject vehicle 101 leaves the restricted section based on the captured image of the camera 4. The exit determination process will be described later with reference to FIG. 6. Finally, in S7, it is determined whether or not the flag IN_CS is 1. If the result in S7 is NO, the process returns to S1. If the result in S7 is YES, the process returns to the S4. After S7, the process may return to S1 or S4 after a predetermined period of time has elapsed.

Figure 4:
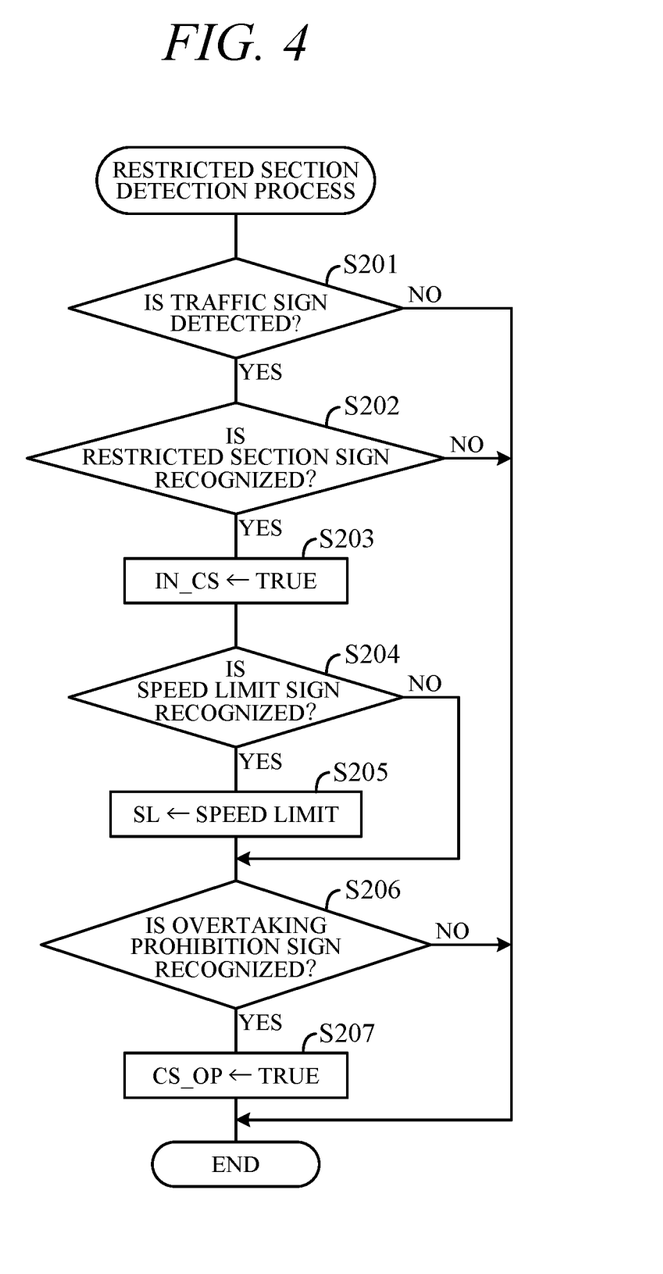
FIG. 4 is a flowchart showing an example of a restricted section detection process of FIG. 3.

FIG. 4 is a flowchart showing an example of the restricted section detection process executed by the controller 10 of FIG. 2. As shown in FIG. 4, first, in S201, it is determined whether or not a traffic sign is detected. If the result in S201 is NO, the restricted section detection process is terminated. If the result in S201 is YES, in S202, it is determined whether or not the traffic sign detected in S201 is a traffic sign indicating that a restricted section exists ahead of the subject vehicle 101 (hereinafter referred to as "restricted section sign").

If the result in S202 is NO, the restricted section detection process is terminated. If the result in S202 is YES, the flag IN_CS is set to 1 in S203. Incidentally, the flag IN_CS may be set to 1 after it is confirmed that the subject vehicle 101 has actually entered the restricted section. Next, in S204, it is determined whether or not the traffic sign detected in S201 is a traffic sign indicating a speed limit, hereinafter referred to as a "speed limit sign". If the result in S204 is NO, the process proceeds to S206. If the result in S204 is YES, the speed limit information SL is set to the speed limit indicated by the speed limit sign in S205.

In S206, it is determined whether or not the traffic sign detected in S201 is a traffic sign indicating a prohibition of overtaking, hereinafter referred to as "overtaking prohibition sign". If the result in S206 is YES, the flag CS_OP is set to 1 in S207 and the restricted section detection process is terminated. If the result in S206 is negative, the restricted section detection process is terminated.

Figure 5:
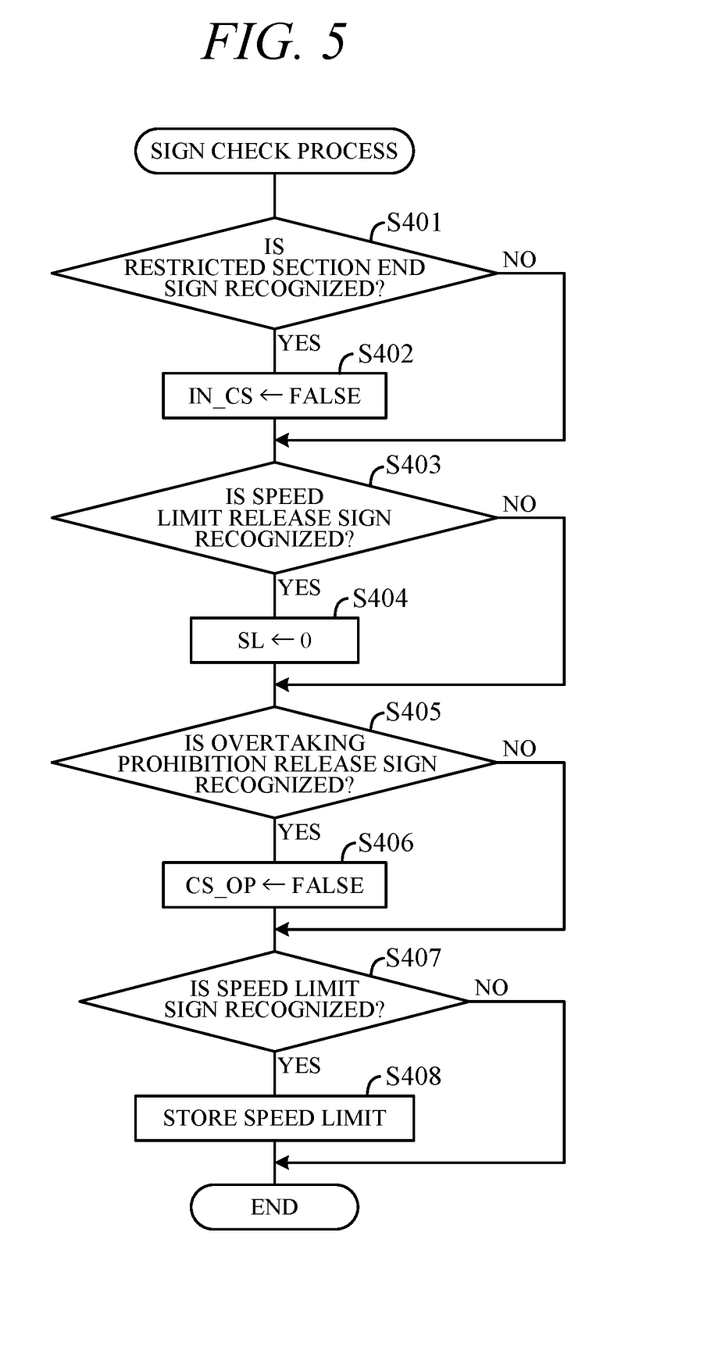
FIG. 5 is a flowchart showing an example of a sign check process of FIG. 3.

FIG. 5 is a flowchart showing an example of the sign check process executed by the controller 10 of FIG. 2. As shown in FIG. 5, first, in S401, it is determined whether or not a traffic sign indicating the end of the restricted section (hereinafter, referred to as "restricted section end sign") is recognized. If the result in S401 is NO, the process proceeds to S403. If the result in S401, the flag IN_CS is set to 0 in S402.

In S403, it is determined whether or not a traffic sign for releasing the speed limit (hereinafter, referred to as "speed limit release sign") is recognized. If the result in S403 is NO, the process proceeds to S405. If the result in S403 is YES, the speed limit information SL is set to 0 km/h in S404. Incidentally, in S404, the speed limit information SL may be set to a speed limit read from the map information.

In S405, it is determined whether or not a traffic sign for releasing the prohibition of overtaking (hereinafter referred to as "overtaking prohibition release sign") is recognized. If the result in S405 is NO, the process proceeds to S407. If the result in S405 is YES, the flag CS_OP is set to 0 in S406.

In S407, it is determined whether or not a speed limit sign is recognized. If the result in S407 is NO, the sign check process is terminated. If the result in S407 is YES, in S408, if information indicated by the speed limit sign (speed limit) differs from the present speed limit information SL, the information (speed limit) is stored in the memory unit 12, and the sign check process is terminated. As described above, when a speed limit sign is recognized within the restricted section, it is considered that the recognized speed limit sign is a permanent speed limit sign, and therefore, information indicated by the speed limit sign is stored in the memory unit 12 without updating the speed limit information SL with the information.

Figure 6:
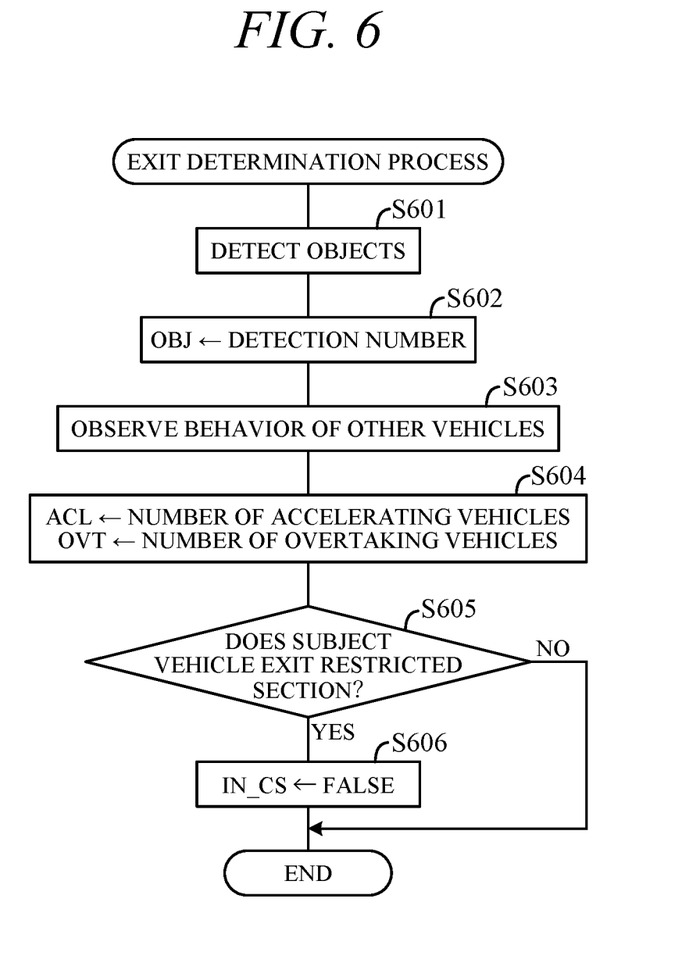
FIG. 6 is a flowchart showing an example of an exit determination process of FIG. 3.

FIG. 6 is a flowchart showing an example of the exit determination process executed by the controller 10 of FIG. 2. As shown in FIG. 6, first, in S601, predetermined objects included in the imaging range of the camera 4 are detected. The predetermined objects are objects related to the restricted section, such as road cones or temporary signboards for prompting a lane change. The value of a number information OBJ is updated in S602 based on the detection result of S601. The number information OBJ is information representing the number of the predetermined object detected in S601.

In S603, the behavior of other vehicles around the subject vehicle 101 is observed. For example, the behavior of the other vehicles may be recognized by detecting changes in the position and the vehicle speed of the other vehicles over a predetermined period based on the captured images of the camera 4 obtained over the predetermined period. Incidentally, the behavior of the other vehicles may be recognized based on information obtained by the V2V (vehicle-to-vehicle) communication via the communication unit 1, or may be recognized by using other methods. In S604, the values of accelerating vehicle information ACL and overtaking vehicle information OVT are updated based on the observed result of S603. The accelerating vehicle information ACL is information indicating the number of vehicles that are accelerating (hereinafter referred to as "accelerating vehicles"). The overtaking vehicle information OVT is information indicating the number of vehicles that have overtaken the subject vehicle 101 (hereinafter referred to as "overtaking vehicles").

In S605, it is determined whether or not the subject vehicle 101 leaves (has exited) the restricted section based on the number information OBJ, the accelerating vehicle information ACL, and the overtaking vehicle information OVT. Specifically, when the value obtained by subtracting the value of the number information OBJ from the value of the accelerating vehicle information ACL is larger than a predetermined value (for example, 1), it is determined that the subject vehicle 101 leaves the restricted section. When the overtaking prohibition is imposed in the restricted section, that is, when the flag CS_OP is 1, if the value obtained by subtracting the value of the number information OBJ from the value of the overtaking vehicle information OVT is larger than a predetermined value (for example, 2), it is determined that the subject vehicle 101 leaves the restricted section. If the result in S605 is NO, the exit determination process is terminated. If the result in S605 is YES, in S606, the flag IN_CS is set to 0, and the exit determination process is terminated.

The control unit 113 performs the vehicle control based on the flags IN_CS, CS_OP and the speed limit information SL, which are updated at any time by the series of processes of FIGS. 3 to 6. Specifically, when the subject vehicle 101 is traveling in the automated driving mode, the control unit 113 controls the actuator AC based on the flags IN_CS, CS_OP and the speed limit information SL. On the contrary, when the subject vehicle 101 is traveling in the manual driving mode, the control unit 113 controls the output device 5 based on the flags IN_CS, CS_OP and the speed limit information SL so that information which needs to be notified to the occupant such as information of a traffic signs is output from the output device 5.

The operation of the vehicle control apparatus 100 according to the present embodiment will be summarized as follows. If the traffic sign TP_WN is recognized ahead of the subject vehicle 101 through the camera 4 while the subject vehicle 101 is traveling on the road RD of FIG. 1 (S201, S202), it is recognized that the construction section RS exists ahead of the sign TP_WN. Further, the start position P1 of the construction section RS is detected based on the position where the traffic sign TP_WN is installed. As described above, the start position P1 of the construction section RS may be detected based on the position of the objects OB1, OB2 detected through the camera 4, or the start position P1 may be detected by other methods.

When the traffic sign PN_SL is recognized after the subject vehicle 101 passes the start position P1 of the construction section RS, the information of the traffic sign PN_SL is stored in the memory unit 12 (S407, S408). Thereafter, the subject vehicle 101 performs the vehicle control based on the information of the last recognized traffic sign TP_SL prior to the subject vehicle 101 entering the restricted section until leaving the construction section RS (S605). Then, the subject vehicle 101, after leaving the construction section RS (S605, S606) until a traffic sign is newly detected, performs the vehicle control based on the information of the traffic sign PN_SL stored in the memory unit 12. If a plurality of traffic signs is detected while the subject vehicle 101 is traveling in the construction section RS, the vehicle control is performed on the basis of the information of the latest traffic sign among the plurality of traffic signs after leaving the construction section RS until a traffic sign is newly detected.

The present embodiment can achieve advantages and effects such as the following:

(1) The vehicle control apparatus 100 includes the camera 4 capturing an image ahead of the subject vehicle 101, the sign recognition unit 111 recognizing a traffic sign included in an imaging range of the image captured by the camera 4, the control unit 113 controlling at least one of the output device 5 and the actuator AC based on an information of the traffic sign recognized by the sign recognition unit 111, and a determination unit 112 determining whether or not the subject vehicle 101 is traveling in a restricted section in which predetermined ravel restriction including at least one of the vehicle speed limit and overtaking limit is imposed temporarily (e.g., a construction section or a section in which a speed limit different from the speed limit set in advance in the road is temporarily set). When the determination unit 112 determines that the subject vehicle 101 is traveling in the restricted section, the control unit 113, even if a traffic sign is recognized by the sign recognition unit, controls at least one of the output device 5 and the actuator AC without using information of the traffic sign. Thus, the information of the traffic sign recognized while the subject vehicle is traveling in the restricted section is no longer applied to the vehicle control. As a result, it is possible to suppress unnecessary application of information of traffic signs permanently installed in the restricted section to the vehicle control, and it is possible to improve the convenience of the occupant of the vehicle traveling on the road on which a construction site and the like is installed. And, when satisfactory traveling control becomes to be carried out in the restricted section, the safety of the traffic in the restricted section is improved, and a sustainable transportation system can be constructed.

(2) The control unit 113 controls at least one of the output device 5 and the actuator AC based on the information of the latest traffic sign among a plurality of traffic signs recognized by the sign recognition unit 111 before the subject vehicle 101 reaches the restricted section when the determination unit 112 determines that the subject vehicle 101 is traveling in the restricted section. Thus, the vehicle control is performed according to a traffic sign recognized just before the subject vehicle enters the restricted section while the subject vehicle is traveling in the restricted section. As a result, appropriate traveling control is performed while the subject vehicle is traveling in the restricted section.

(3) The sign recognition unit 111 stores the information of the traffic sign recognized while the determination unit 112 determines that the subject vehicle 101 is traveling in the restricted section in the memory unit 12. The control unit 113 controls at least one of the output device 5 and the actuator AC based on the information of the traffic sign stored in the memory unit 12 when the determination unit 112 determines that the subject vehicle 101 leaves the restricted section. Thus, before and after the vehicle leaves the restricted section, it is possible to appropriately switch the information of the traffic sign to be applied to the vehicle control. As a result, the vehicle control can be satisfactorily performed not only while the subject vehicle is traveling in the restricted section but also after the subject vehicle leaves the restricted section.

Figure 7:
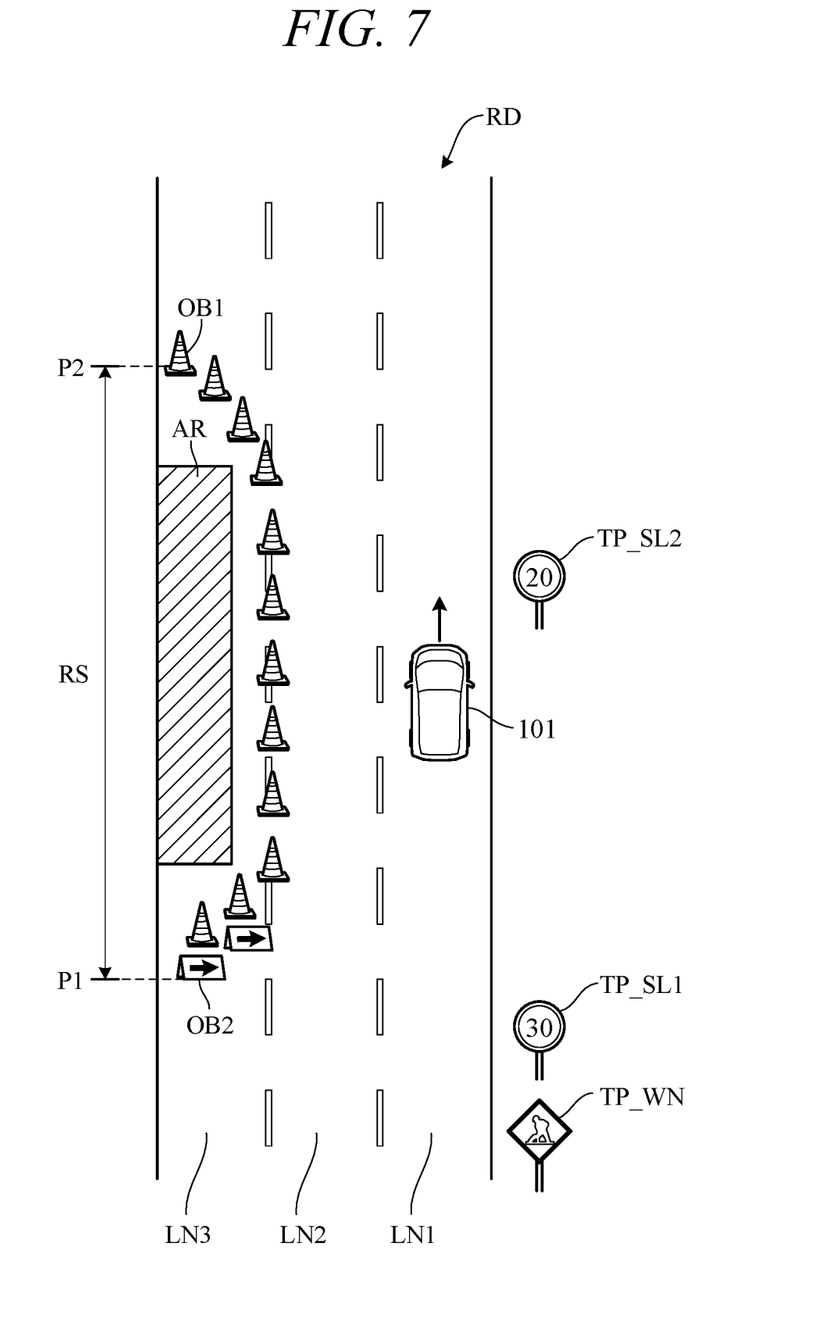
FIG. 7 is a diagram showing an example of a traveling scene of a vehicle having a vehicle control apparatus according to a modification of the embodiment of the present invention.

The above embodiment may be modified in various modifications. Several modifications will be described below. FIG. 7 is a diagram showing an example of a driving scene to which the vehicle control apparatus according to a modification of the above embodiment is applied. The example shown in FIG. 7 is the same as the example shown in FIG. 1, but a traffic sign TP_SL2 is installed in place of the traffic sign PN_SL in the construction section RS. The traffic sign TP_SL2 is a sign that is temporarily installed during the construction period, and indicates that the maximum vehicle speed is limited to 20 km/h from the installation position. Incidentally, the traffic sign TP_SL2 may be a permanent sign. The traffic sign TP_SL1 is the same traffic sign as the traffic sign TP_SL of FIG. 1.

As described above, when the traffic sign (second traffic sign) TP_SL2 indicating the speed limit lower than the speed limit indicated by the traffic sign (first traffic sign) TP_SL1 installed before the construction section RS exists in the construction section RS, there is a possibility that the vehicle cannot appropriately travel in the construction section RS if the sign check process is performed according to the flow of FIG. 5. More specifically, even if the traffic sign TP_SL2 is recognized when the subject vehicle 102 is traveling in the construction section RS, the information of the traffic sign TP_SL2 is not reflected in the vehicle control until the subject vehicle leaves the construction section RS. Therefore, there is a possibility that the travel exceeding the speed limit is performed in the construction section RS. In order to cope with such a problem, a sign check process may be performed as follows.

Figure 8:
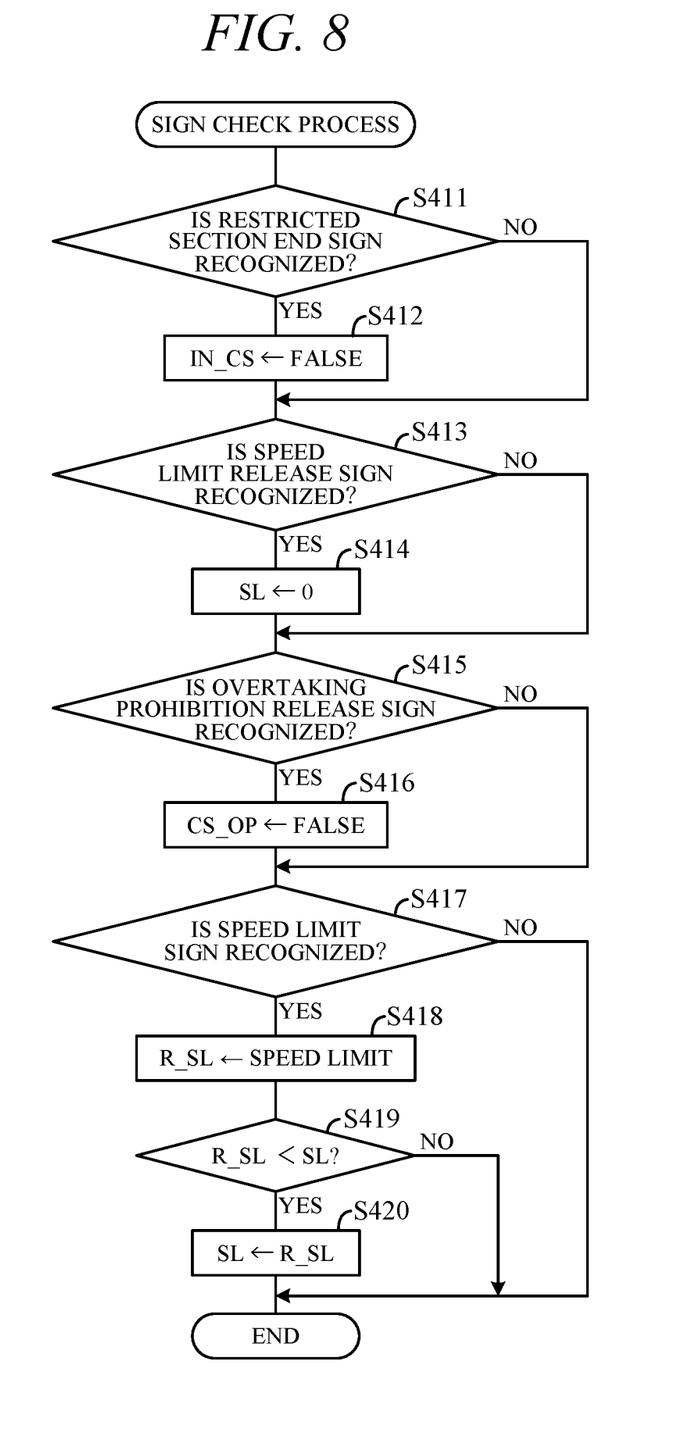
FIG. 8 is a flowchart showing the sign check process executed by the controller of the vehicle control apparatus according to the modification.

FIG. 8 is a flowchart showing the sign check process executed by the controller of the vehicle control apparatus according to this modification. The configuration of the vehicle control apparatus according to this modification is the same as that of FIG. 2, and therefore description thereof is omitted. Processes other than the sign check process which are executed by the controller of this modification are the same as the processes shown in FIGS. 3, 4, and 6, and therefore descriptions thereof are omitted. Further, since the processes of S411 to S417 are the same as the processes of S401 to S407 in FIG. 5, description thereof is omitted.

As shown in FIG. 8, when the speed limit sign is recognized in S417, that is, when the result in S417 is YES, a speed limit information R_SL is set to the speed limit indicated by the speed limit sign in S418. The speed limit information R_SL is information indicating the speed limit indicated by the most recently recognized speed limit sign. On the contrary, if the result in S417 is NO, the sign check process is terminated.

Next, in S419, it is determined whether or not the speed limit information R_SL is set to a speed limit smaller than the speed limit indicated by the speed limit information SL. If the result in S419 is NO, the sign check process is terminated. If the result in S419 is YES, the speed limit information SL is updated with the speed limit information R_SL in S420, and the sign check process is terminated. As described above, in the present modification, when the speed limit indicated by the speed limit sign recognized in the restricted section is smaller than the speed limit indicated by the speed limit information SL, it is determined that the speed limit is set lower for a special reason, and the speed limit information SL is updated with the speed limit information R_SL. An example of the special reason is that the road widths is even narrower in the section ahead of the installation position of the speed limit sign recognized in S417. Another example of the special reason is that a bump is present in the section ahead of the installation position of the speed limit sign recognized in S417. Thus, it is possible to perform more satisfactory traveling control in the restricted section.

Further, in the above embodiment, the camera 4 serving as a capturing unit is adapted to detect surrounding circumstances of the subject vehicle 101 (circumstances ahead of the subject vehicle 101) as an in-vehicle detector, as long as it detects surrounding circumstances of the subject vehicle 101, the configuration of the in-vehicle detector is not limited to this. For example, the in-vehicle detector may be a radar or a lidar. In addition, the detection range of the in-vehicle detector may be adjusted in consideration of the effects of weather and occlusion. For example, the detection range may be extended in the traveling direction of the subject vehicle 101 under the condition that the state in which any objects related to the restricted section is not detected continues for a predetermined time.

In the above embodiment, the output device 5 serving as a notification unit is configured to include a display, a speaker, and the like, but the notification unit may be configured to include cabin lights and other lights installed in the cabin. According to such a configuration, information of a traffic sign and the like can be notified to the driver by lights and the like.

Further, in the above embodiment, the vehicle control apparatus 100 is applied to an automated vehicle, but the vehicle control apparatus 100 is also applicable to non-automated vehicles. For example, the vehicle control apparatus 100 can be applied to a manually operated vehicle including ADAS (Advanced Driver Assistance Systems).

According to the present invention, it is possible to perform satisfactory traveling control while the subject vehicle is traveling on a road in which a traffic sign is temporarily installed.

The above embodiment can be combined as desired with one or more of the above modifications. The modifications can also be combined with one another.

Above, while the present invention has been described with reference to the preferred embodiments thereof, it will be understood, by those skilled in the art, that various changes and modifications may be made thereto without departing from the scope of the appended claims.

What is claimed is:

1. A vehicle control apparatus comprising:
an actuator used for traveling;
an output device outputting information; and
a microprocessor and a memory coupled to the microprocessor, wherein
the microprocessor is configured to perform:
capturing an image ahead of the vehicle;
recognizing a traffic sign included in an imaging range of the image captured in the capturing;
controlling at least one of the output device and the actuator based on information of the traffic sign recognized in the recognizing; and
determining whether the vehicle is traveling in a restricted section in which a predetermined travel restriction including at least one of a vehicle speed limit and overtaking limit is imposed temporarily, wherein
the microprocessor is configured to perform
the controlling including controlling, when it is determined that the vehicle is traveling in the restricted section in the determining, at least one of the output device and the actuator without using the information of the traffic sign even if the traffic sign is recognized in the recognizing.

2. The vehicle control apparatus according to claim 1, wherein
the microprocessor is configured to perform
the controlling including controlling, when it is determined that the vehicle is traveling in the restricted section in the determining, at least one of the output device and the actuator based on a latest traffic sign among traffic signs recognized in the recognizing before the vehicle reaches the restricted section.

3. The vehicle control apparatus according to claim 1, wherein
the restricted section is a section under a construction.

4. The vehicle control apparatus according to claim 1, wherein
the restricted section is a section temporally installed on a road where the vehicle is traveling and a speed limit different from a speed limit set to the road in advance is set.

5. The vehicle control apparatus according to claim 1, wherein
the microprocessor is configured to perform
the recognizing including storing information of a traffic sign recognized while it is determined in the determining that the vehicle is traveling in the restricted section in the memory.

6. The vehicle control apparatus according to claim 5, wherein
the microprocessor is configured to perform
the controlling including controlling, when it is determined that the vehicle leaves the restricted section in the determining, at least one of the output device and the actuator based on the information of the traffic sign stored in the memory.

7. The vehicle control apparatus according to claim 6, further comprising
a sensor detecting a current position of the vehicle, wherein
the memory stores map information, and
the microprocessor is configured to perform
the determining including detecting a point where a number of lanes recognized based on the captured image matches a number of lanes indicated by the map information as an end position of the restricted section to determine that the vehicle leaves the restricted section when the current position of the vehicle detected by the sensor exceeds the end position of the restricted section.

8. A vehicle control apparatus comprising:
an actuator used for traveling;
an output device outputting information; and
a microprocessor and a memory coupled to the microprocessor, wherein
the microprocessor is configured to perform:
capturing an image ahead of the vehicle;
recognizing a traffic sign included in an imaging range of the image captured in the capturing;
controlling at least one of the output device and the actuator based on information of the traffic sign recognized in the recognizing; and
determining whether the vehicle is traveling in a restricted section in which a predetermined travel restriction including at least one of a vehicle speed limit and overtaking limit is imposed temporarily, wherein
the recognizing includes recognizing a plurality of speed limit signs before the vehicle reaches the restricted section, and
the microprocessor is configured to perform
the controlling including controlling, when it is determined in the determining that the vehicle is traveling in the restricted section, at least one of the output device and the actuator based on a first traffic sign, the first traffic sign being a latest speed limit sign among the plurality of speed limit signs recognized in the recognizing, and then, controlling, when a second traffic sign indicating a lower speed limit than the first traffic sign is recognized in the recognizing while the vehicle is traveling in the restricted section, at least one of the output device and the actuator based on the second traffic sign.

9. A vehicle control apparatus comprising:
an actuator used for traveling;
an output device outputting information; and
a microprocessor and a memory coupled to the microprocessor, wherein
the microprocessor is configured to function as:
a capturing unit configured to capture an image ahead of the vehicle;
a sign recognition unit configured to recognize a traffic sign included in an imaging range of the image captured by the capturing unit;
a control unit configured to control at least one of the output device and the actuator based on information of the traffic sign recognized by the sign recognition unit; and
a determination unit configured to determine whether the vehicle is traveling in a restricted section in which a predetermined travel restriction including at least one of a vehicle speed limit and overtaking limit is imposed temporarily, wherein
the control unit is configured to control, when it is determined by the determination unit that the vehicle is traveling in the restricted section, at least one of the output device and the actuator without using the information of the traffic sign even if the traffic sign is recognized by the sign recognition unit.

10. The vehicle control apparatus according to claim 9, wherein
the control unit is configured to control, when it is determined by the determination unit that the vehicle is traveling in the restricted section, at least one of the output device and the actuator based on a latest traffic sign among traffic signs recognized by the sign recognition unit before the vehicle reaches the restricted section.

11. The vehicle control apparatus according to claim 9, wherein
the restricted section is a section under a construction.

12. The vehicle control apparatus according to claim 9, wherein
the restricted section is a section temporally installed on a road where the vehicle is traveling and a speed limit different from a speed limit set to the road in advance is set.

13. The vehicle control apparatus according to claim 9, wherein
the sign recognition unit is further configured to store information of a traffic sign recognized while it is determined by the determination unit that the vehicle is traveling in the restricted section in the memory.

14. The vehicle control apparatus according to claim 13, wherein
the control unit is configured to control, when it is determined by the determination unit that the vehicle leaves the restricted section, at least one of the output device and the actuator based on the information of the traffic sign stored in the memory.

15. The vehicle control apparatus according to claim 14, further comprising
a sensor detecting a current position of the vehicle, wherein
the memory stores map information, and
the determination unit is configured to detect a point where a number of lanes recognized based on the captured image acquired by the capturing unit matches a number of lanes indicated by the map information as an end position of the restricted section to determine that the vehicle leaves the restricted section when the current position of the vehicle detected by the sensor exceeds the end position of the restricted section.

16. A vehicle control apparatus comprising:
an actuator used for traveling;
an output device outputting information; and
a microprocessor and a memory coupled to the microprocessor, wherein
the microprocessor is configured to function as:
a capturing unit configured to capture an image ahead of the vehicle;
a sign recognition unit configured to recognize a traffic sign included in an imaging range of the image captured by the capturing unit;
a control unit configured to control at least one of the output device and the actuator based on information of the traffic sign recognized by the sign recognition unit; and
a determination unit configured to determine whether the vehicle is traveling in a restricted section in which a predetermined travel restriction including at least one of a vehicle speed limit and overtaking limit is imposed temporarily, wherein
the determination unit configured to recognize a plurality of speed limit signs before the vehicle reaches the restricted section, and
the control unit configured to control, when it is determined by the determination unit that the vehicle is traveling in the restricted section, at least one of the output device and the actuator based on a first traffic sign, the first traffic sign being a latest speed limit sign among the plurality of speed limit signs recognized by the sign recognition unit, and then, controlling, when a second traffic sign indicating a lower speed limit than the first traffic sign is recognized by the sign recognition unit while the vehicle is traveling in the restricted section, at least one of the output device and the actuator based on the second traffic sign.

* * * * *